(12) United States Patent
Uchida

(10) Patent No.: US 12,128,660 B2
(45) Date of Patent: Oct. 29, 2024

(54) VEHICLE INTERIOR MATERIAL

(71) Applicant: NIHON PLAST CO., LTD., Fujinomiya (JP)

(72) Inventor: Yasuhiro Uchida, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 101 days.

(21) Appl. No.: 18/121,025

(22) Filed: Mar. 14, 2023

(65) Prior Publication Data

US 2023/0302759 A1    Sep. 28, 2023

(30) Foreign Application Priority Data

Mar. 24, 2022    (JP) ................................ 2022-047818

(51) Int. Cl.
*B32B 3/04* (2006.01)
*B32B 3/14* (2006.01)
*B60R 13/02* (2006.01)
*B32B 9/02* (2006.01)
*B32B 9/04* (2006.01)
*B32B 27/08* (2006.01)

(52) U.S. Cl.
CPC .................. *B32B 3/04* (2013.01); *B32B 3/14* (2013.01); *B60R 13/02* (2013.01); *B32B 9/025* (2013.01); *B32B 9/045* (2013.01); *B32B 27/08* (2013.01); *B32B 2605/003* (2013.01)

(58) Field of Classification Search
None
See application file for complete search history.

(56) References Cited

FOREIGN PATENT DOCUMENTS

JP    2019-089536    6/2019

*Primary Examiner* — Alexander S Thomas
(74) *Attorney, Agent, or Firm* — Amin, Turocy & Watson, LLP

(57) ABSTRACT

A vehicle interior material in which a skin body is less likely to rise from a base material at a position of an end portion is provided. The vehicle interior material includes a base material and skin body 3 covering at least a part of a front side of the base material and bonded to the base material. Skin body 3 includes folded portion 15 folded to a side of back surface 10b. Back surface 10b is exposed to a side of the base material at a position of an end portion of folded portion 15 in an extending direction.

6 Claims, 7 Drawing Sheets

VEHICLE INTERIOR MATERIAL

CROSS REFERENCE TO RELATED APPLICATIONS

The disclosure of Japanese Patent Application No. 2022-047818 filed on Mar. 24, 2022 including the specification, drawings and abstract is incorporated herein by reference in its entirety.

TECHNICAL FIELD

The present invention relates to a vehicle interior material including a skin body covering at least a part of a front side of a base material and bonded to the base material.

BACKGROUND ART

In the related art, there is an interior material including a skin body made of leather, synthetic resin, or the like in order to give a high-class feeling to an interior material that covers an interior of a vehicle such as an automobile. In the skin body used for this interior material, a so-called double stitch, in which two sewing threads are arranged in parallel, is sometimes used as sewing for improving decorativeness. Furthermore, in order to improve a texture, it is known that a double stitch is positioned across joined part by folding side edges of a pair of skin bodies to a back side, joining the folded ends to each other, and stitching each of the folded portions (for example, see PTL 1).

CITATION LIST

Patent Literature

PTL 1
Japanese Patent Application Laid-Open No. 2019-89536 (pages 4 to 7, FIGS. 1 to 4)

SUMMARY OF INVENTION

Technical Problem

In a case where a skin body is attached to a front surface of a base material, an adhesive is applied to a back side of the skin body. However, in a configuration in which the side edge of the skin body is folded as described above, in the folded portion, the front surface of the skin body is positioned on the back side of the skin body. The front surface of the skin body is subjected to special processing to improve water resistance and abrasion resistance, and by its properties, the affinity with the adhesives is lower than that of the unprocessed parts.

Therefore, in a case where the folded portion obtained by folding the side edge of the skin body to the back side extends to the end portion of the skin body, a gap is generated between the front surface of the folded portion and the front surface of the base material, on which it is difficult for the adhesive to act normally, and there is a concern that the skin may peel off or the double stitch may be warped, which may harm the appearance.

The present invention has been made in view of such a point, and an object of the present invention is to provide a vehicle interior material in which the skin body is less likely to rise from the base material at a position of the end portion.

Solution to Problem

A vehicle interior material according to aspect 1 includes a base material and a skin body covering at least a part of a front side of the base material and bonded to the base material, in which the skin body includes a folded portion folded to a side of a back surface, and the back surface is exposed to a side of the base material at a position of an end portion of the folded portion in an extending direction.

A vehicle interior material according to aspect 2 is the vehicle interior material according to aspect 1, in which the skin body has a plurality of skin pieces, the folded portion is formed at least one of the skin pieces, and side edge portions of the skin pieces are seamed together.

A vehicle interior material according to aspect 3 is the vehicle interior material according to aspect 2, in which the skin pieces each have the folded portion, and the folded portions are seamed together.

A vehicle interior material according to aspect 4 is the vehicle interior material according to aspects 1 to 3, in which the skin body has a sewn portion along the folded portion.

Advantageous Effects of Invention

According to the vehicle interior material according to aspect 1, since the skin body can be bonded to the base material at the position where the back surface of the end portion of the folded portion is exposed, the skin body is less likely to rise from the base material at the position of the end portion.

According to the vehicle interior material according to aspect 2, in addition to the effect of the vehicle interior material according to aspect 1, it is possible to configure a vehicle interior material excellent in design, which has a seam of the skin pieces as a design.

According to the vehicle interior material according to aspect 3, in addition to the effect of the vehicle interior material according to aspect 2, it is possible to present an appearance with excellent design in which the skin pieces are wound together at a position of the side edge portions.

According to the vehicle interior material according to aspects 4 to 6, in addition to the effects of the vehicle interior material according to aspects 1 to 3, respectively, the sewn portion can improve decorativeness.

DESCRIPTION OF EMBODIMENTS

Hereinafter, an embodiment 1 of the present invention will be described with reference to the drawings.

Figure 1:
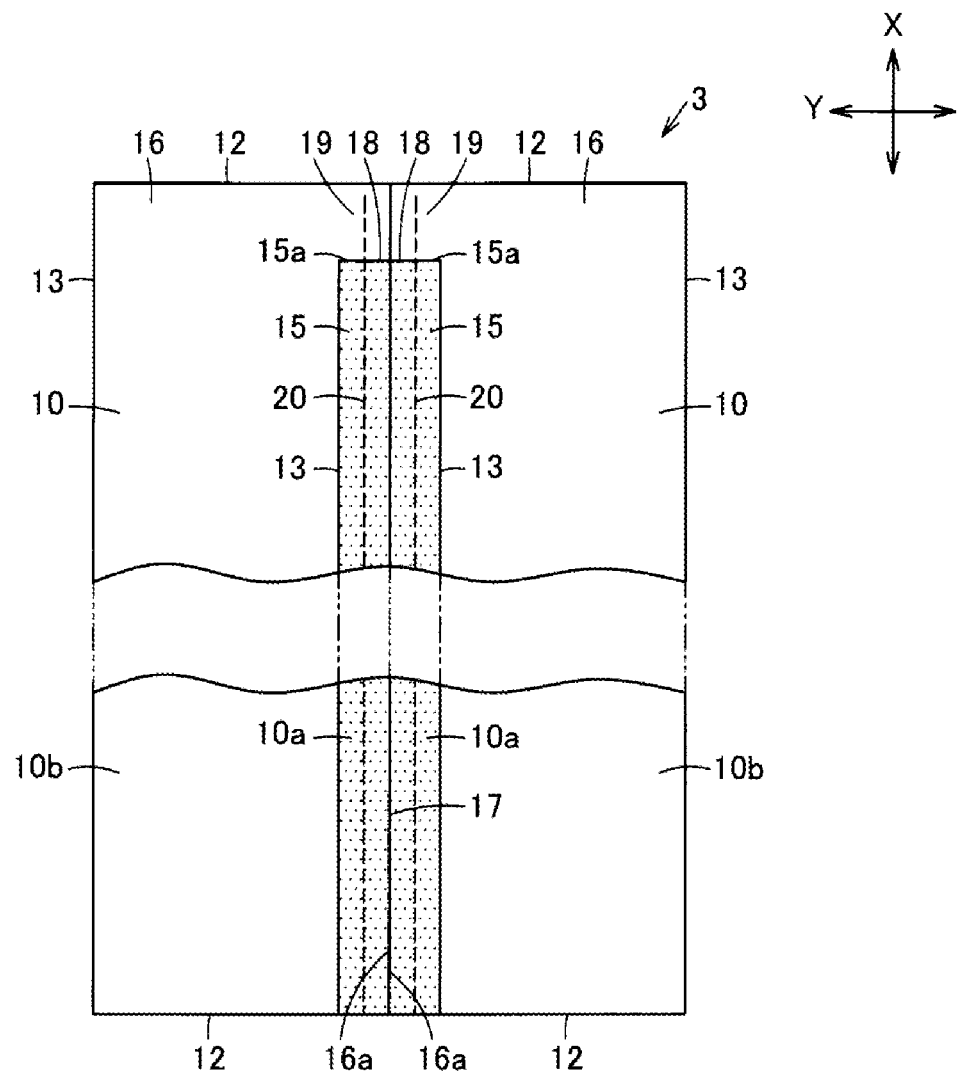
FIG. 1 is a plan view showing a skin body of a vehicle interior material according to an embodiment 1 of the present invention from a back surface side.
Figure 4A:
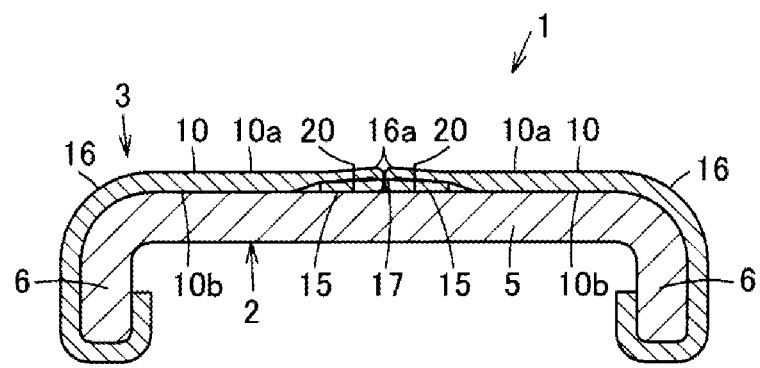
FIG. 4A is a cross-sectional view of a position corresponding to I-I in FIG. 4B.
Figure 4B:
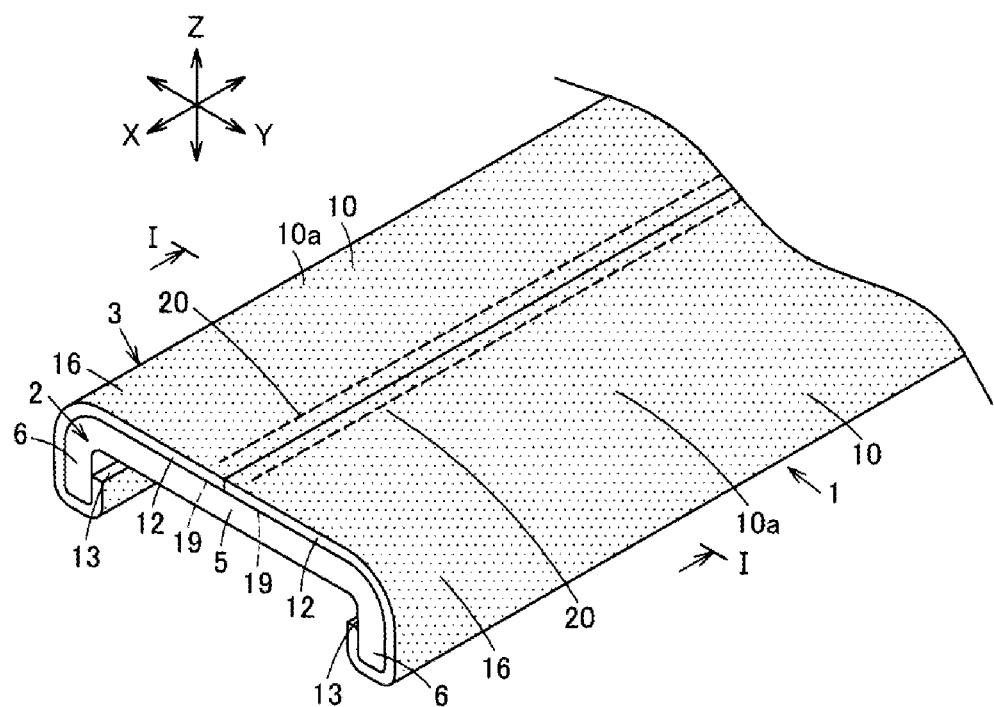
FIG. 4B is a perspective view showing a part of the vehicle interior material.

In FIGS. 4A and 4B, 1 indicates a vehicle interior material. In the present embodiment, vehicle interior material 1 is used for an interior of a vehicle such as an automobile. In the shown example, although vehicle interior material 1 is formed in a rectangular shape elongated in a predetermined direction, it is not limited to this, and vehicle interior material 1 may be formed in any shape according to a shape of a disposition position or a desired design. In the present embodiment, a longitudinal direction of vehicle interior material 1 is described as a first direction (indicated by arrow X), a width direction, which is a direction orthogonal to the first direction, is described as a second direction (indicated by arrow Y), and a thickness direction is described as a third direction (indicated by arrow Z), which is a direction orthogonal to the first direction and the second direction.

Vehicle interior material 1 is configured by stacking base material 2 and skin body 3 on each other. Another member such as an elastic material (cushion material) may be disposed in at least a part between base material 2 and skin body 3. Vehicle interior material 1 is disposed such that skin body 3 side is an occupant side, a near side, a front side or a design side and base material 2 side is a vehicle body side, a counter-occupant side, a rear side, or a back side.

Base material 2 is molded with a member such as a synthetic resin. In the present embodiment, base material 2 integrally includes base material main body portion 5 and extension portion 6 extending from base material main body portion 5 in the third direction. Base material main body portion 5 is formed in a rectangular shape having a longitudinal direction in the first direction and a lateral direction in the second direction. Extension portions 6 are continuous from both side portions of base material main body portion 5, that is, end portions in the second direction. Extension portion 6 is elongated in the first direction and is continuous over the entire side edge portion of base material main body portion 5. Base material 2 has a U-shaped cross section because of base material main body portion 5 and extension portions 6 and 6.

At least a part of the front side of base material 2 is covered with skin body 3. In the present embodiment, the front surface of base material main body portion 5 and the front surface of extension portion 6 of base material 2 are entirely covered with skin body 3.

Skin body 3 has a sheet shape. In the present embodiment, a plurality of skin pieces 10 are seamed together to integrally configure skin body 3. In the shown example, a pair of skin pieces 10 are set. Skin piece 10 is formed in a sheet shape from any material such as natural leather, artificial leather, or resin. Skin piece 10 may be a composite material integrally formed by laminating a plurality of sheets of different materials.

In the present embodiment, skin pieces 10 are set on one side and the other side of base material 2 in the second direction, respectively, and are disposed such that their side edge portions are seamed to cover the entire front side of base material 2. Preferably, front surface 10a of skin piece 10, which is a design surface forming the front surface of skin body 3, is subjected to special processing to improve water resistance and abrasion resistance. Back surface 10b of skin piece 10 forming the back surface of skin body 3 is attached to base material 2 with an adhesive. Back surface 10b is in a state or made of a material having better adhesion to the adhesive than front surface 10a. In each drawing, front surface 10a of skin piece 10 is shaded for clarity of explanation.

Figure 2:
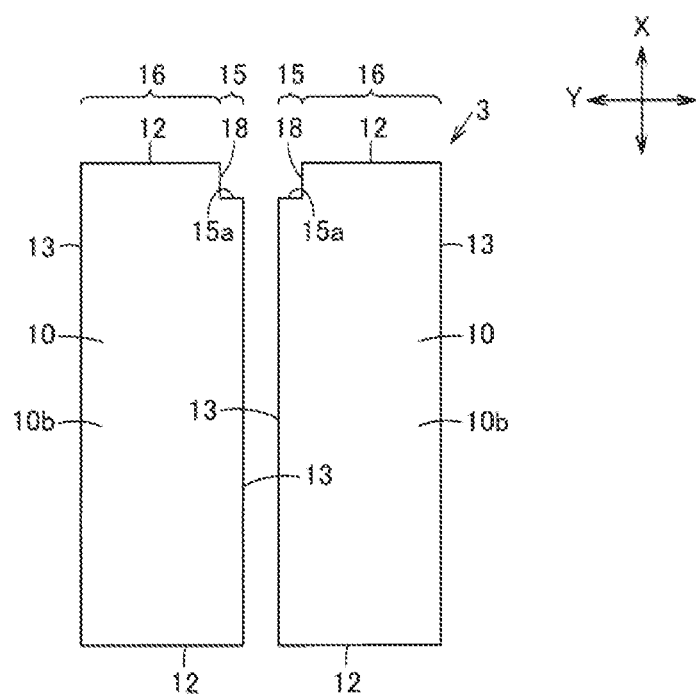
FIG. 2 is a plan view showing skin pieces of the same skin body from the back surface side.

As shown in FIG. 2, skin pieces 10 and 10 have shapes that are symmetrical or substantially symmetrical to each other in the second direction. Each skin piece 10 has a rectangular shape having end edge portions 12 and 12 forming an outer edge in the first direction and side edge portions 13 and 13 forming an outer edge in the second direction. As shown in FIG. 4B, in the present embodiment, skin piece 10 is positioned such that end edge portion 12 is flush or substantially flush with the end edge portion of base material 2 and is disposed on the front side of base material 2.

FIG. 1 is a plan view of skin pieces 10 and 10 viewed from a side of back surface 10b, that is, base material 2 (FIG. 4A). As shown in FIG. 1, each skin piece 10 is seamed to one another in a state in which a part of skin piece 10 is folded to the side of back surface 10b. In the present embodiment, at least one of skin pieces 10 or each skin piece in the shown example, is formed with folded portion 15 which is a margin to sew up that is folded to the side of back surface 10b and overlapped, on one side edge portion 13. Therefore, a part excluding folded portion 15 is configured as skin piece main body portion 16 which is a main portion of skin piece 10.

Figure 3:
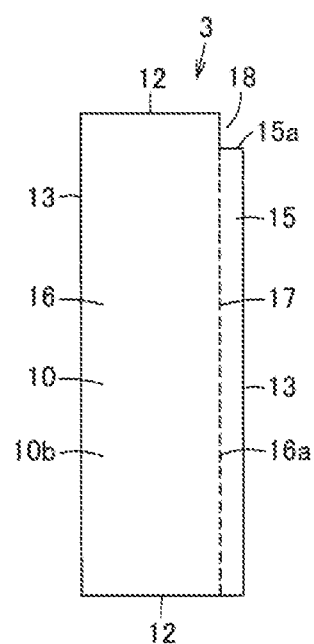
FIG. 3 is a plan view showing one step of a method of manufacturing the same vehicle interior material.

Skin piece main body portion 16 constitutes the majority of skin piece 10. As shown in FIGS. 4A and 4B, skin piece main body portion 16 constitutes a design part of vehicle interior material 1. In the present embodiment, skin piece main body portion 16 has a rectangular shape elongated in the first direction. As shown in FIGS. 4A and 4B, skin piece main body portion 16 covers a part of base material 2 extending from the front surface of base material main body portion 5 to the front surface of extension portion 6. Side edge portions 16a of skin piece main body portion 16 are adjacent to each other, and folded portions 15 are joined to each other by joining portion 17 to seam the skin pieces 10 together. As shown in FIG. 3, joining portion 17 is formed along side edge portion 16a of skin piece main body portion 16. In the present embodiment, joining portion 17 is formed by sewing. As shown in FIG. 4A, joining portion 17 is positioned between adjacent side edge portions 16a and 16a and is a part that is substantially invisible from the front side.

On the other hand, as shown in FIGS. 1 and 2, folded portion 15 is formed in a strip shape narrower in the second direction (left and right direction in FIG. 1) than skin piece main body portion 16. Folded portion 15 is a part basically invisible from the front side of vehicle interior material 1 (FIG. 4A), that is, from the outside. In the present embodiment, folded portion 15 has a rectangular shape that is elongated in the first direction (up and down direction in FIG. 1). Folded portion 15 is formed to be shorter in the first direction than skin piece main body portion 16. In the present embodiment, in folded portion 15, end portion 15a of at least one side in the first direction (upper side in FIG. 1), which is an extending direction of folded portion 15, is shortened to the other side in the first direction (lower side in FIG. 1) with respect to skin piece main body portion 16 (end edge portion 12). In the shown example, end portion 15a of folded portion 15 extends linearly in the second direction (left and right direction in FIG. 1), and is offset by a predetermined distance, for example, about 10 mm, toward the other side in the first direction (lower side in FIG. 1) with respect to end edge portion 12, which is the end portion of skin piece main body portion 16, so that end portion 15a and end edge portion 12 are connected in a stepped manner. Therefore, cutout portion 18 is formed at a position of end portion 15a of folded portion 15 in skin piece 10. In the present embodiment, cutout portion 18 is formed in a rectangular shape with an L-shaped outer edge at side edge portion 16a of skin piece main body portion 16 and end portion 15a of folded portion 15. Since a side of end portion 15a of folded portion 15 is short in the first direction (up and down direction in FIG. 1) with respect to end edge portion 12 which is the end portion of skin piece main body portion 16, in a state in which folded portion 15 is overlapped on the back surface of skin piece main body portion 16, exposed portion 19 exposing the back surface of skin piece main body portion 16 (skin piece 10) is formed between end portion 15a of folded portion 15 and end edge portion 12, which is the end portion of skin piece main body portion 16. In a case of the present embodiment, exposed portion 19 is exposed at a position of cutout portion 18.

Preferably, sewn portion 20 is formed on skin body 3. Sewn portion 20 decorates skin body 3. Sewn portion 20 is formed along folded portion 15 of skin piece 10. That is, sewn portion 20 extends linearly in the first direction (up and down direction in FIG. 1). Sewn portion 20 may be formed on at least one of skin pieces 10, but is formed on each skin piece 10 in the present embodiment. Therefore, as shown in FIG. 4A, sewn portions 20 and 20 are formed by so-called double stitch, positioned side by side on both sides of side edge portions 16a and 16a, which are seamed portions of skin pieces 10 and 10, as a center. In the present embodiment, sewn portions 20 and 20 are positioned parallel or substantially parallel.

Sewn portion 20 is formed by sewing together skin piece main body portion 16 and folded portion 15 which is folded to the side of the back surface of skin piece main body portion 16 and overlapped. The end portion of sewn portion 20 passes over end portion 15a of folded portion 15 and is continuous to exposed portion 19 of skin piece main body portion 16. In addition, the end portion of sewn portion 20 is positioned in the vicinity of end edge portion 12 of skin piece 10.

Next, a method of manufacturing vehicle interior material 1 of the embodiment 1 will be described.

First, as shown in FIG. 2, at a position of side edge portion 13 to be folded portion 15, a plurality of skin pieces 10 having a short part in the first direction (up and down direction in FIG. 1) with respect to end edge portion 12 to be the end portion of skin piece main body portion 16 are prepared. For example, in a case of a pair of skin pieces 10 and 10, the shapes are symmetrical or substantially symmetrical to each other in the second direction (left and right direction in FIG. 2).

Next, as shown in FIG. 3, front surfaces 10a of skin piece 10 are overlapped, and folded portions 15 are joined to each other by joining portion 17 at a position of side edge portion 16a of skin piece main body portion 16 that serves as a boundary between folded portion 15 and skin piece main body portion 16. In the present embodiment, joining portion 17 is primary sewing.

After that, as shown in FIG. 3, in a state in which skin pieces 10 and 10 are opened and folded portions 15 and 15 are overlapped with skin piece main body portions 16 and 16, folded portions 15 and 15 and skin piece main body portion 16 and 16 are joined by sewn portions 20 and 20. In the present embodiment, sewn portion 20 is secondary sewing.

As a result, skin pieces 10 and 10 are adjacent to each other at a position of side edge portions 16a and 16a in the second direction (left and right direction in FIG. 1) and are spread in a plane shape, and skin body 3 is formed in which sewn portions 20 and 20 extend across a position where skin pieces 10 and 10 are seamed.

Then, as shown in FIG. 4A, this skin body 3 is attached to base material 2 separately formed in advance with an adhesive.

At this time, in the present embodiment, since end portion 15a in the extending direction of folded portion 15 folded to the side of the back surface at the side edge portion of skin body 3 is shorter than end edge portion 12, which is the end edge portion of skin piece main body portion 16, back surface 10b of skin piece 10, which is the back surface of skin body 3, has exposed portion 19 that exposes, so that back surface 10b of skin piece 10 can be bonded to base material 2 at a position of this exposed portion 19. Since back surface 10b of skin piece 10 is not subjected to any special processing or the like and is easy for the adhesive to act normally, skin body 3 is less likely to rise from base material 2 at the position of the end portion (end edge portion 12 of skin piece 10), thereby providing vehicle interior material 1 with excellent appearance quality.

A plurality of skin pieces 10, each of which has folded portion 15 formed on at least one of them, are seamed together at the side edge portion to constitute skin body 3, so that vehicle interior material 1 that is excellent in design and has a seam of skin piece 10 as a design, can be constructed. In addition, by configuring skin body 3 with the plurality of skin pieces 10, skin body 3 can easily follow the shape of base material 2.

In addition, folded portion 15 on each of skin pieces 10 is formed and folded portions 15 are seamed together to form skin body 3, so that skin pieces 10 are wound together at the position of the side edge portion and an appearance with excellent design can be exhibited.

By having sewn portion 20 along folded portion 15 of skin piece 10 of skin body 3, sewn portion 20 can improve decorativeness. In particular, in the present embodiment, since each skin piece 10 has folded portion 15, sewn portion 20 is provided along folded portion 15, which results in double stitch and further improves decorativeness.

Moreover, since skin body 3 is less likely to rise from base material 2 at the position of end edge portion 12, the line of sewn portion 20 is less likely to be warped, and the appearance can be further improved.

Figure 5:
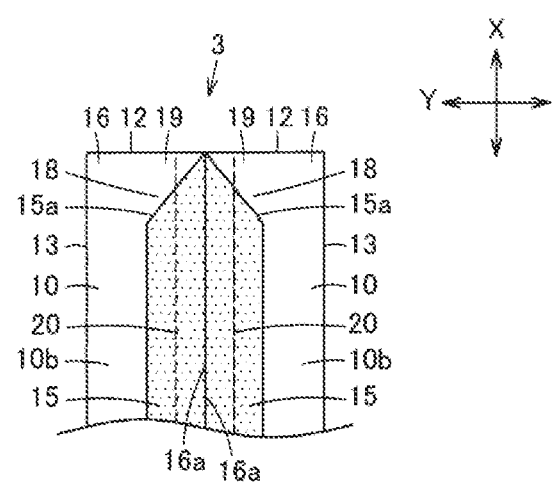
FIG. 5 is a plan view showing a skin body of a vehicle interior material according to an embodiment 2 of the present invention from the back surface side.
Figure 6:
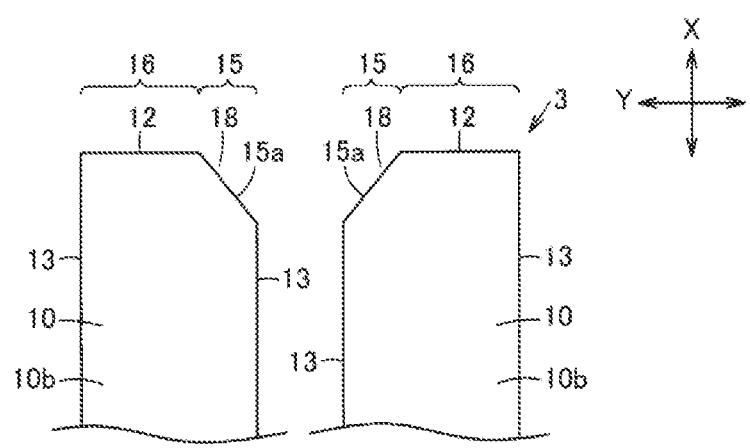
FIG. 6 is a plan view showing skin pieces of the same skin body from the back surface side.
Figure 7:
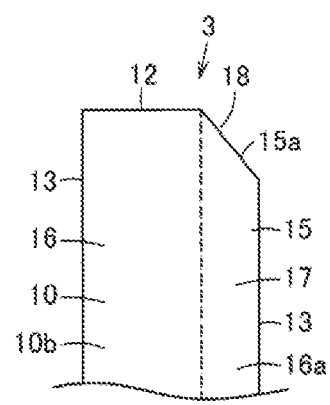
FIG. 7 is a plan view showing one step of a method of manufacturing the same vehicle interior material.

Next, an embodiment 2 will be described with reference to FIGS. 5 to 7. The same reference numerals are given to the same configurations and actions as in the embodiment 1, and the description thereof will be omitted.

In the present embodiment, folded portion 15 is set at the position of end portion 15a to gradually shorten in the first direction (up and down direction in FIG. 5) with respect to end edge portion 12 which is the end portion of skin piece main body portion 16 toward side edge portion 13. Therefore, end portion 15a of folded portion 15 is inclined with respect to the second direction (left and right direction in FIG. 5). In the shown example, end portion 15a is directly connected to end edge portion 12. As an example, end portion 15a has a linear shape. End portion 15a is not limited to this, and may be a curved shape, a broken line shape, or the like.

Therefore, cutout portion 18 is formed at the position of end portion 15a of folded portion 15 in skin piece 10. In the present embodiment, cutout portion 18 is formed in a triangular (right-angled triangle) shape whose outer edge is straightened by inclined end portion 15a. Since the side of end portion 15a folded portion 15 is short in the first direction with respect to end edge portion 12, which is the end portion of skin piece main body portion 16, in a state in which folded portion 15 is overlapped on the back surface of skin piece main body portion 16, exposed portion 19 in which the back surface of skin piece main body portion 16 (skin piece 10) is exposed is formed between end portion 15a of folded portion 15 and end edge portion 12, which is the end portion of skin piece main body portion 16. In a case of the present embodiment, exposed portion 19 is exposed at the position of cutout portion 18.

In this way, exposed portion 19 in which back surface 10b of skin piece 10 is exposed at a position of end portion 15a in the extending direction of folded portion 15 is formed, so that the same actions and effects as that of the embodiment 1 can be achieved, for example, back surface 10b of skin piece 10 can be bonded to base material 2 at a position of exposed portion 19, skin body 3 is less likely to rise from base material 2 at a position of the end portion (end edge portion 12 of skin piece 10), and vehicle interior material 1 with excellent appearance quality can be provided.

In each of the above-described embodiments, folded portion 15 may be formed on only one of adjacent skin pieces 10.

In addition, cutout portions 18 may be formed at positions of both end portions of folded portion 15. That is, cutout portion 18 may be formed at any location where the end portion of skin body 3 is not desired to be raised from base material 2.

Furthermore, the shape of cutout portion 18 may be arbitrarily set as long as it can be made into a shape suitable for bonding exposed portion 19 to base material 2.

In addition, although skin body 3 is composed of a plurality of skin pieces 10, skin body 3 is not limited to this, and may be configured in a shape of a single integrated sheet.

INDUSTRIAL APPLICABILITY

The present invention can be suitably used, for example, as a vehicle interior material for an automobile.

REFERENCE SIGNS LIST

1 Vehicle interior material
2 Base material
3 Skin body
10 Skin piece
10b Back surface
15 Folded portion
20 Sewn portion

What is claimed is:

1. A vehicle interior material comprising:
  a base material; and
  a skin body covering at least a part of a front side of the base material and bonded to the base material, wherein
  the skin body includes a folded portion folded to a side of a back surface, and the back surface is exposed to a side of the base material at a position of an end portion of the folded portion in an extending direction.

2. The vehicle interior material according to claim 1, wherein
  the skin body has a plurality of skin pieces, the folded portion is formed at least one of the skin pieces, and side edge portions of the skin pieces are seamed together.

3. The vehicle interior material according to claim 2, wherein
  the skin pieces each have the folded portion, and the folded portions are seamed together.

4. The vehicle interior material according to claim 3, wherein
  the skin body has a sewn portion along the folded portion.

5. The vehicle interior material according to claim 2, wherein
  the skin body has a sewn portion along the folded portion.

6. The vehicle interior material according to claim 1, wherein
  the skin body has a sewn portion along the folded portion.

* * * * *